United States Patent
Park et al.

(10) Patent No.: US 7,239,363 B2
(45) Date of Patent: Jul. 3, 2007

(54) LIQUID CRYSTAL DISPLAY DEVICE INCLUDING COLOR FILTER

(75) Inventors: Kwang-Soon Park, Taegu-kwangyokshi (KR); Pyung-Hun Kim, Kyongsangbuk-do (KR)

(73) Assignee: LG.Philips LCD Co., Ltd, Youngdungapo-ku, Seoul (KR)

( * ) Notice: Subject to any disclaimer, the term of this patent is extended or adjusted under 35 U.S.C. 154(b) by 204 days.

(21) Appl. No.: 10/732,275

(22) Filed: Dec. 11, 2003

(65) Prior Publication Data

US 2004/0125278 A1 Jul. 1, 2004

(30) Foreign Application Priority Data

Dec. 31, 2002 (KR) .................. 10-2002-0088481

(51) Int. Cl.
*G02F 1/1335* (2006.01)
*G09G 3/36* (2006.01)

(52) U.S. Cl. ............... 349/109; 349/106; 349/108; 345/88

(58) Field of Classification Search ............ 349/106, 349/108–109; 345/88
See application file for complete search history.

(56) References Cited

U.S. PATENT DOCUMENTS

| | | | | | |
|---|---|---|---|---|---|
| 5,055,921 | A | * | 10/1991 | Usui | 358/512 |
| 5,642,176 | A | * | 6/1997 | Abukawa et al. | 349/106 |
| 5,792,579 | A | * | 8/1998 | Phillips | 430/7 |
| 6,084,650 | A | * | 7/2000 | Sekiguchi | 349/106 |
| 6,671,025 | B1 | * | 12/2003 | Ikeda et al. | 349/156 |
| 6,734,931 | B2 | * | 5/2004 | Yu | 349/106 |
| 6,867,549 | B2 | * | 3/2005 | Cok et al. | 315/169.3 |

* cited by examiner

*Primary Examiner*—Andrew Schechter
*Assistant Examiner*—Hoan Nguyen
(74) *Attorney, Agent, or Firm*—McKenna Long & Aldridge LLP

(57) ABSTRACT

A liquid crystal display device including a color filter is disclosed in the present invention. The liquid crystal display device includes a first substrate where a plurality of sub-pixels are defined thereon, a second substrate spaced apart from the first substrate, and a color filter layer on the second substrate, facing into the first substrate, and having a red sub-color filter, a green sub-color filter, and a blue sub-color filter, wherein one blue sub-color filter corresponds to two sub-pixels adjacent to each other in a first direction perpendicular to a second direction where the red, green, and blue sub-color filters are alternately located.

12 Claims, 3 Drawing Sheets

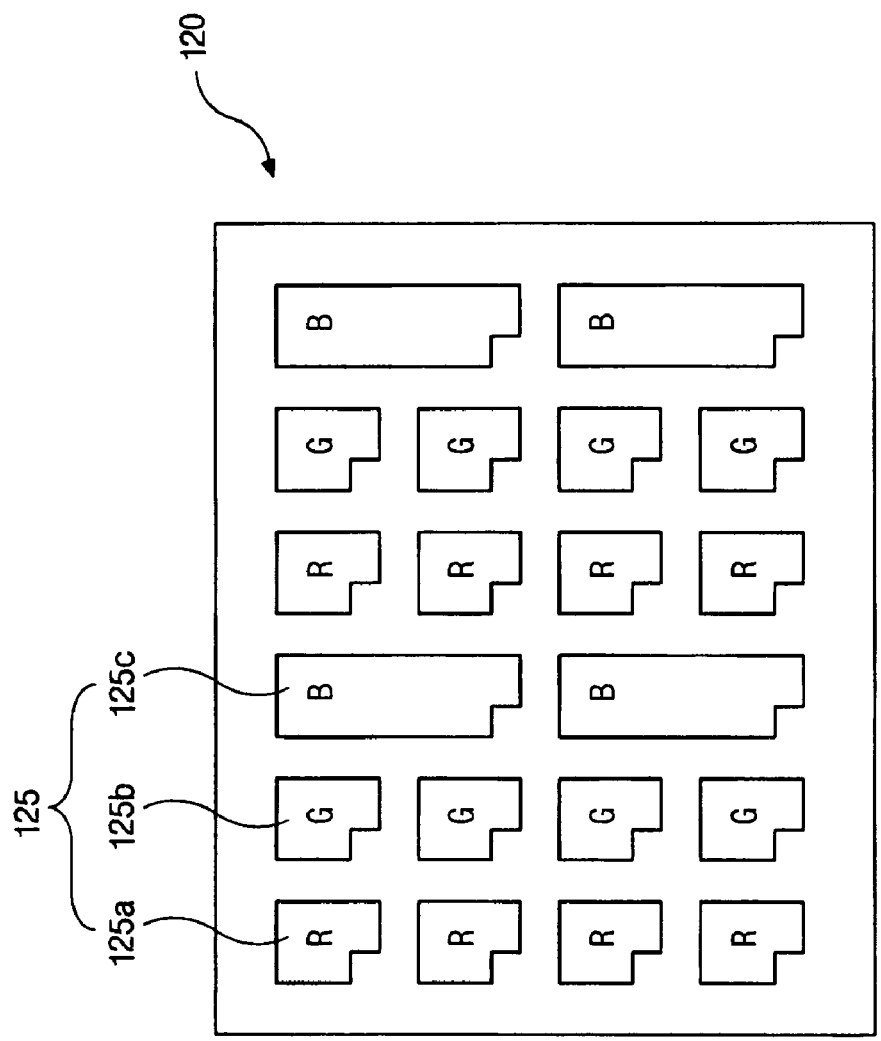

LIQUID CRYSTAL DISPLAY DEVICE INCLUDING COLOR FILTER

This application claims the benefit of the Korean Patent Application No. P2002-088481 filed on Dec. 31, 2002, which is hereby incorporated by reference.

BACKGROUND OF THE INVENTION

1. Field of the Invention

The present invention relates to a liquid crystal display device, and more particularly, to an active matrix liquid crystal display device including color filters of red, green, and blue. Although the present invention is suitable for a wide scope of applications, it is particularly suitable for reproducing images having near natural colors.

2. Discussion of the Related Art

In general, a liquid crystal display (LCD) device includes two substrates that are spaced apart from and face into each other, and a liquid crystal material layer interposed between the two substrates. Each of the substrates includes electrodes that face into each other, wherein a voltage applied to each electrode induces an electric field between the electrodes. An alignment of liquid crystal molecules of the liquid crystal material layer, which has characteristics of dielectric anisotropy and spontaneous polarization, is changed by varying an intensity or direction of the applied electric field. Accordingly, the LCD device displays an image by varying light transmittance through the liquid crystal material layer in accordance with the arrangement of the liquid crystal molecules.

Recently, an LCD device, which includes pixels arranged in a matrix form and each pixel is controlled by a switching element, is widely used due to its high resolution and fast moving images. The LCD device is referred to as an active matrix LCD (AM-LCD) device, and a thin film transistor is generally used as the switching element.

Hereinafter, the liquid crystal display device according to the related art will be described with reference to FIG. 1.

FIG. 1 is an expanded perspective view of a liquid crystal display (LCD) device according to the related art. In FIG. 1, an LCD device 5 has first and second substrates 10 and 20, which are spaced apart from and facing into each other, and a liquid crystal layer 30 interposed between the first and second substrates 10 and 20.

A plurality of gate lines 13 and a plurality of data lines 15 are formed on the inner surface of the first substrate 10, whereby the gate lines 13 and the date lines 15 cross each other to define sub-pixel regions P having a matrix form, and a thin film transistor T is formed at each intersection of the gate lines 13 and the data line 15. The thin film transistor T is composed of a gate electrode, a source electrode, and a drain electrode. A pixel electrode 17, which is connected to the thin film transistor T, is formed in each sub-pixel region P. The liquid crystal layer 30 is applied with a voltage through the pixel electrode 17.

The second substrate 20 includes a black matrix 23, a color filter layer 25, and a common electrode 27 subsequently disposed on the inner surface thereof. The color filter layer 25 includes three sub-color filters of red (R) 25a, green (G) 25b, and blue (B) 25c alternating with one another. The black matrix 23 has openings such that each sub-color filter 25a, 25b, and 25c of the color filter layer 25 corresponds to the opening of the black matrix 23. The black matrix 23 corresponds to the gate lines 13, the data lines 15, and the thin film transistors T, exposing the pixel electrode 17 for displaying an image. The common electrode 27 is formed of a transparent conducting material and acts as another electrode for applying voltage to the liquid crystal layer 30.

Although not shown in the FIG. 1, a seal pattern is formed in the periphery between the first substrate 10 and the second substrate 20 in order to maintain a cell gap for injecting a liquid crystal material, to attach the substrates 10 and 20, and to prevent the liquid crystal material from leaking. A first alignment layer and a second alignment layer are formed between the first substrate 10 and the liquid crystal layer 30 and between the second substrate 20 and the liquid crystal layer 30, respectively.

In the liquid crystal display device, a common voltage Vcom is applied to the common electrode 27, a scanning voltage, which turns on or off the thin film transistor T, is applied to the gate line 13, and a data voltage (or an image voltage) is applied to the data line 15.

Therefore, when the thin film transistor T is turned on by the scanning voltage, the data voltage is provided to the pixel electrode 17 through the thin film transistor T. Liquid crystal molecules of the liquid crystal layer 30 are arranged according to the electric field induced between the common electrode 27 and the pixel electrode 17 by forming dipoles by a voltage difference between the common electrode 27 and the pixel electrode 17.

Optical modulation of the liquid crystal layer 30 occurs according to the arrangement of the liquid crystal molecules. Therefore, light transmittance of the liquid crystal material layer 30 in each sub-pixel can be controlled by transmitting or blocking light due to the optical modulation. In addition, color images of the LCD device are produced by mixing light that passes through red, green, and blue sub-color filters 25a, 25b, and 25c, each of which corresponds to each sub-pixel P. Therefore, a pixel, which functions as a basic unit for displaying an image, is composed of three sub-pixels.

There are visual cells in a retina of an eye, and the visual cells include three kinds of cone cells and rod cells. The cone cells distinguish colors of light and the rod cells distinguish light and shade. The cone cells are composed of L-cone cells that sense a red color, M-cone cells that perceive a green color, and S-cone cells that sense a blue color. Here, though there are differences among people, the S-cone cells are just $1/14$ to $1/20$ of other cone cells in number. Additionally, the three cone cells spread out all over the retina, and especially, are crowded in a fovea centralis. However, there exist no S-cone cells in the fovea centralis.

Thus, a distinguishable ability of blue color is deficient as compared to the other colors. If images are displayed in the LCD device having red, green, and blue sub-color filters, which are equal in number and size, intended images are different from the images shown by the LCD.

In order to solve the problem, a method increasing brightness of the blue sub-color filter may have been proposed, but this does not provide a complete solution. There is a limitation in that the LCD device displays images are different from the intended images.

SUMMARY OF THE INVENTION

Accordingly, the present invention is directed to a liquid crystal display device including a color filter layer that substantially obviates one or more of problems due to limitations and disadvantages of the related art.

Another object of the present invention is to provide a liquid crystal display device including a color filter that has an increased aperture ratio and displays images close to natural images.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a first substrate where a plurality of sub-pixels are defined thereon, a second substrate spaced apart from the first substrate, and a color filter layer on the second substrate, facing into the first substrate, and having a red sub-color filter, a green sub-color filter, and a blue sub-color filter, wherein one blue sub-color filter corresponds to two sub-pixels adjacent to each other in a first direction perpendicular to a second direction where the red, green, and blue sub-color filters are alternately located.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIG. 3 is a plane view of a color filter substrate for the LCD device according to the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
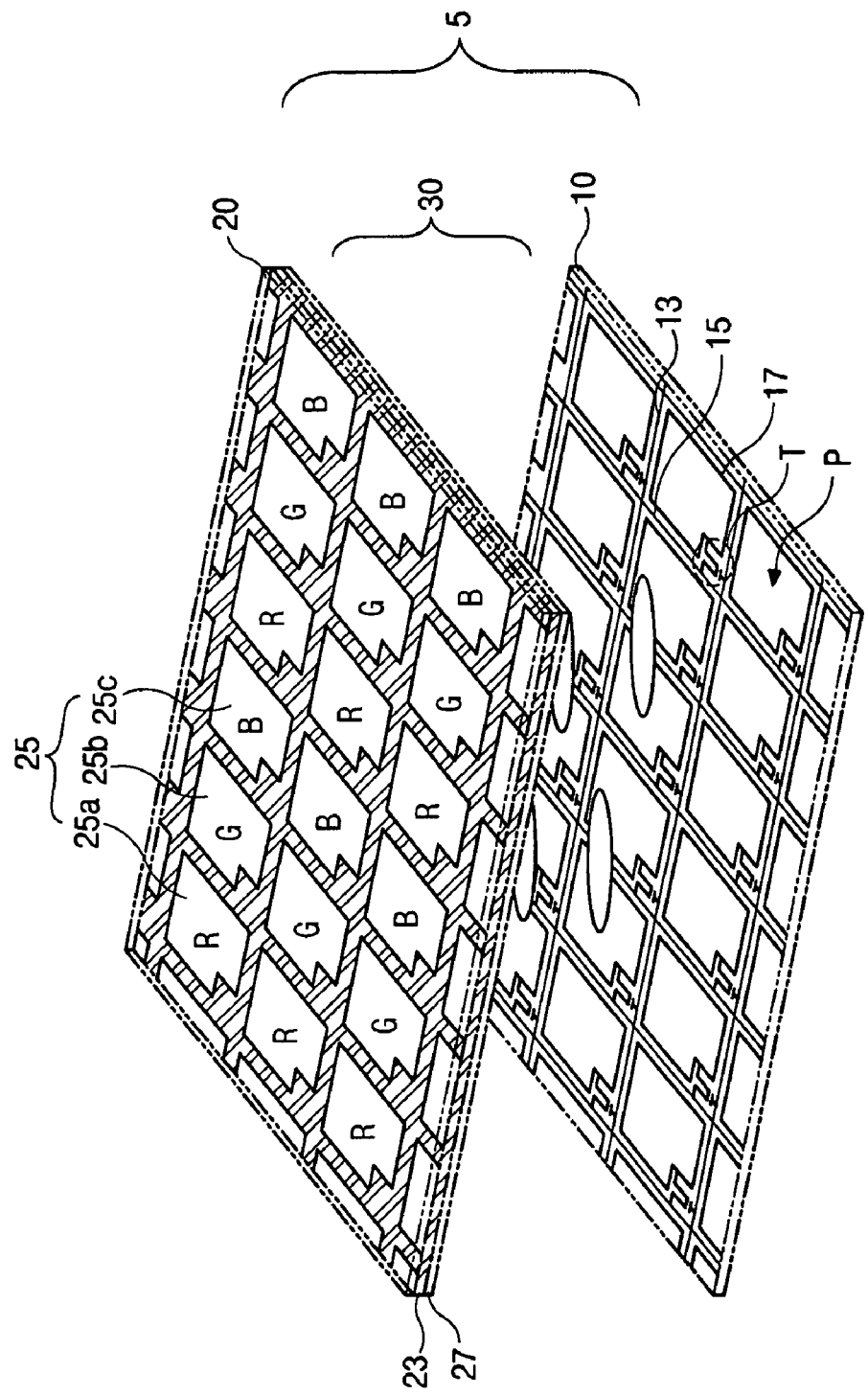
FIG. 1 is an expanded perspective view of a liquid crystal display (LCD) device according to the related art.
Figure 2:
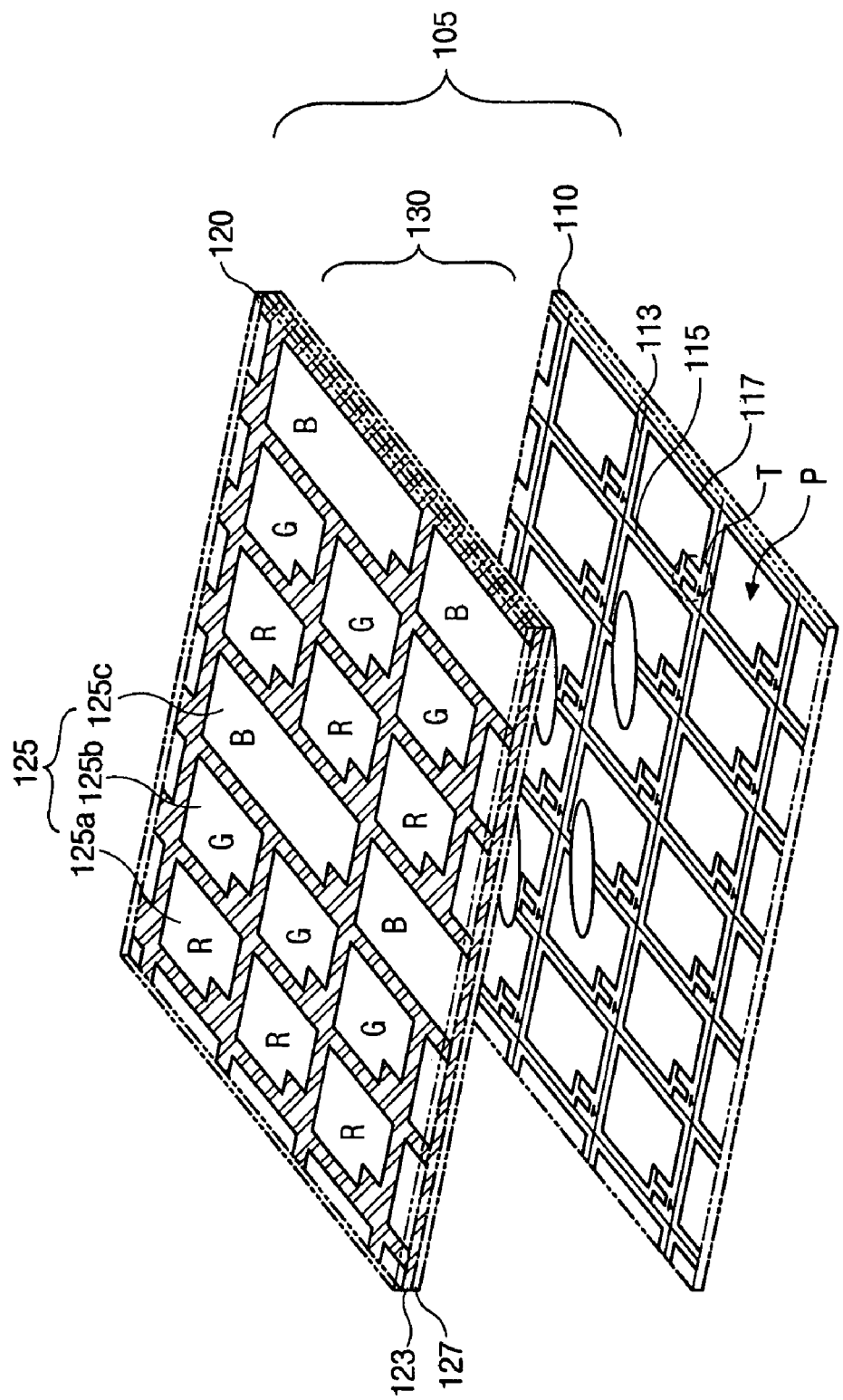
FIG. 2 is an expanded perspective view of a liquid crystal display (LCD) device according to the present invention.

FIG. 2 is an expanded perspective view of a liquid crystal display (LCD) device according to the present invention. In FIG. 2, a liquid crystal display (LCD) device includes first and second substrates 110 and 120, which are spaced apart from and facing into each other, and a liquid crystal layer 130 interposed between the first substrate 110 and the second substrate 120.

A plurality of gate lines 113 and a plurality of data lines 115 are formed on the inner surface of the first substrate 110. The plurality of gate lines 113 and the plurality of data lines 115 cross each other to define sub-pixel regions P having a matrix form. A thin film transistor T is formed at each intersection of the gate lines 113 and the data lines 115. A pixel electrode 117 is formed at each sub-pixel region P and is connected to the thin film transistor T. The pixel electrode 117 functions as an electrode for applying voltage to the liquid crystal layer 130.

A black matrix 123, a color filter layer 125, and a common electrode 127 are subsequently formed on the inner surface of the second substrate 120. The black matrix 123 corresponds to the gate lines 113, the data lines 115, and the thin film transistors T, exposing the pixel electrodes 117 for displaying an image.

The color filter layer 125 includes three sub-color filters of red (R) 125a, green (G) 125b, and blue (B) 125c alternating with one another, and the black matrix 123 is disposed between the sub-color filters 125a, 125b, and 125c. The common electrode 127 is formed of a transparent conducting material and functions as another electrode for applying voltage to the liquid crystal layer 130.

In the LCD device of the present invention, the red sub-color filter 125a or the green sub-color filter 125b corresponds to one sub-pixel region P, while the blue sub-color filter 125c corresponds to two sub-pixel regions P.

More detailed explanation will be made with reference to the attached FIG. 3.

FIG. 3 is a plane view of a color filter substrate for the LCD device according to the present invention. In FIG. 3, a color filter substrate 120 includes color filter layers 125, which are composed of sub-color filters of red 125a, green 125b, and blue 125c alternating with one another, as stated above. The blue sub-color filter 125c corresponds to two sub-pixels arranged in the vertical direction.

Thus, the blue sub-color filter 125c is more than twice as large as the red and green sub-color filters 125a and 125b, if the black matrix 123 (shown in FIG. 2) between the adjacent sub-color filters is considered. The LCD device may be a stripe type, where the sub-color filters having the same color are arranged in a line.

In the present invention, one blue sub-color filter 125c, two red sub-color filters 125a, and two green sub-color filters 125b constitute a unit, wherein the two red sub-color filters 125a corresponding to respective sub-pixels are adjacent to each other in the vertical direction in FIG. 3. The two green sub-color filters 125b corresponding to respective sub-pixels are adjacent to each other, and the blue sub-color filter 125c corresponds to both two sub-pixels adjacent to each other in the vertical direction in FIG. 3 and a portion between the adjacent sub-pixels. The units are repeatedly arranged in the vertical direction and in the horizontal direction in FIG. 3. Here, the sub-color filters of the same color are arranged in a line, and thus the color filter layer has a stripe form.

The black matrix 123 (shown FIG. 2) between the sub-color filters 125a, 125b, and 125c also has a different shape from that of the related art. Since the blue sub-color filter 125c also corresponds to the portion between the adjacent sub-pixels in the vertical direction in FIG. 3, the size of the black matrix 123 (shown in FIG. 2) is reduced as compared to the related art.

Therefore, the brightness of the LCD device can be improved due to an increase in the aperture ratio, and blue components in a displayed image may be increased as the blue color areas are enlarged.

The operation of the LCD device of the present invention will be explained hereinafter.

A scanning voltage is sequentially applied to the gate lines 113 (shown in FIG. 2), thereby turning on or off the thin film transistors T. When a thin film transistor T is turned on, a data voltage is supplied to the pixel electrode 117 through the data line 115 and the thin film transistor T, thereby operating each sub-pixel.

Here, the blue sub-color filter 125c, which corresponds to a first sub-pixel in an (i)th gate line and a second sub-pixel in an (i+1)th gate line, responds to all of the operations of the first and second sub-pixels. Therefore, since the brightness of the LCD device may be unnecessarily increased, the blue sub-color filter 125c may have a lower brightness than the red and green sub-color filters 125a and 125b to compensate the brightness of the LCD device. The brightness of the blue sub-color filter 125c may be about ½ of the red and green sub-color filters 125b and 125c. Although the brightness of the blue sub-color filter 125c may be decreased to about ½ of the red and green sub-color filters 125b and 125c, the LCD device of the present invention can display images having large blue components as compared to the related art due to the increased aperture ratio.

The LCD device of the present invention is advantageous in that the displayed images are abundant in blue components.

Especially, the aperture ratio is increased because the blue sub-color filter has an enlarged size, thereby displaying images close to the natural images.

It will be apparent to those skilled in the art that various modifications and variations can be made in the liquid crystal display device including a color filter layer of the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
   a first substrate having a plurality of sub-pixels defined thereon;
   a second substrate spaced apart from the first substrate; and
   a color filter layer on the second substrate, facing the first substrate, and having a red sub-color filter, a green sub-color filter, and a blue sub-color filter, wherein one blue sub-color filter corresponds to two sub-pixels adjacent to each other in a first direction perpendicular to a second direction where the red, green and blue sub-color filters are alternately located,
   wherein the blue sub-color filter has a brightness lower than the red and green sub-color filters,
   wherein the brightness of the blue sub-color filter is about ½ of the red and green sub-color filters.

2. The device according to claim 1, wherein both the red sub-color filter and the green sub-color filter correspond to one sub-pixel.

3. The device according to claim 1, further comprising a black matrix on the second substrate, wherein the black matrix surrounds the red, green, and blue sub-color filters.

4. The device according to claim 1, wherein the color filter layer has a unit repeatedly arranged, wherein the unit is composed of one blue sub-color filter, two red sub-color filters and two green sub-color filters.

5. The device according to claim 1, wherein the two red sub-color filters and the two green sub-color filters are arranged in the same direction.

6. The device according to claim 1, wherein the blue sub-color filter is disposed between the two red-sub color filters and the two green-sub color filters.

7. The device according to claim 1, further comprising a pixel electrode at each sub-pixel.

8. The device according to claim 7, further comprising a thin film transistor connected to the pixel electrode.

9. The device according to claim 7, further comprising a plurality of gate lines and a plurality of data lines on the first substrate, wherein the plurality of gate lines and the plurality of data lines cross each other and define the plurality of sub-pixels.

10. The device according to claim 1, wherein the plurality of sub-pixels have the same size.

11. The device according to claims 1, wherein sub-color filters of the same color are arranged in the first direction.

12. A liquid crystal display device, comprising:
   a first substrate having a plurality of sub-pixels, each of the plurality of sub-pixels having a space from adjacent sub-pixels;
   a second substrate spaced apart from the first substrate; and
   a color filter layer on the second substrate, facing the first substrate, and having red sub-color filters, green sub-color filters, and blue sub-color filters, wherein one blue sub-color filter of a unit corresponds to two sub-pixels adjacent to each other and covers a space between the two sub-pixels in a first direction perpendicular to a second direction where the red, green and blue sub-color filters are alternately located, wherein the one blue sub-color filter, two red sub-color filters and two green sub-color filters form the unit, wherein the two red sub-color filters of the unit are adjacent to each other, and the two green sub-color filters of the unit are adjacent to each other.

* * * * *